US008561152B2

(12) United States Patent
Novak et al.

(10) Patent No.: US 8,561,152 B2
(45) Date of Patent: Oct. 15, 2013

(54) TARGET-BASED ACCESS CHECK INDEPENDENT OF ACCESS REQUEST

(75) Inventors: Mark F. Novak, Newcastle, WA (US); Karanbir Singh, Seattle, WA (US); David M. McPherson, Bothell, WA (US); Andrey Popov, Renton, WA (US); Ming Tang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 13/109,530

(22) Filed: May 17, 2011

(65) Prior Publication Data

US 2012/0297455 A1 Nov. 22, 2012

(51) Int. Cl.
*G06F 21/00* (2013.01)

(52) U.S. Cl.
USPC ........ 726/4; 726/1; 726/8; 713/150; 713/165; 709/229; 705/51

(58) Field of Classification Search
USPC ....................................................... 726/1, 4
See application file for complete search history.

(56) References Cited

U.S. PATENT DOCUMENTS

| | | | |
|---|---|---|---|
| 6,920,558 B2 | 7/2005 | Sames et al. | |
| 7,793,333 B2 | 9/2010 | Goh et al. | |
| 7,849,495 B1 | 12/2010 | Huang et al. | |
| 2002/0138763 A1* | 9/2002 | Delany et al. | 713/201 |
| 2004/0083367 A1* | 4/2004 | Garg et al. | 713/170 |
| 2004/0098615 A1 | 5/2004 | Mowers et al. | |
| 2006/0074894 A1* | 4/2006 | Remahl et al. | 707/4 |
| 2006/0294373 A1* | 12/2006 | Stamos et al. | 713/165 |
| 2007/0174905 A1* | 7/2007 | Martherus et al. | 726/8 |
| 2007/0198462 A1 | 8/2007 | Ohta et al. | |
| 2008/0083014 A1* | 4/2008 | Lim | 726/1 |
| 2008/0155649 A1* | 6/2008 | Maler et al. | 726/1 |
| 2008/0229428 A1* | 9/2008 | Camiel | 726/27 |
| 2009/0193497 A1 | 7/2009 | Kikuchi et al. | |
| 2010/0100941 A1* | 4/2010 | Eom et al. | 726/4 |
| 2010/0251366 A1* | 9/2010 | Baldry | 726/22 |
| 2011/0191541 A1* | 8/2011 | Lowry et al. | 711/119 |
| 2011/0231900 A1* | 9/2011 | Shimoe | 726/1 |
| 2011/0247046 A1* | 10/2011 | Gross et al. | 726/1 |
| 2011/0258430 A1* | 10/2011 | Luukkala et al. | 713/150 |

OTHER PUBLICATIONS

Mohan, et al., "An Attribute-based Authorization Policy Framework with Dynamic Conflict Resolution", Retrieved at <<http://middleware.internet2.edu/idtrust/2010/papers/03-mohan-attribute-authorization-policy.pdf>>, Proceedings of the 9th Symposium on Identity and Trust on the Internet, IDtrust, Apr. 13-15, 2010, pp. 14.

(Continued)

*Primary Examiner* — Morshed Mehedi
(74) *Attorney, Agent, or Firm* — Merchant & Gould P.C.

(57) ABSTRACT

A context of a principal is built, at a target system controlling access to a resource, independently of the principal requesting access to the resource. An authorization policy is applied, at the target system, to the context to determine whether the principal is permitted to access the resource, and an indication of whether the principal is permitted to access the resource is provided (e.g., to an administrator). Modifications can be made to the context and the authorization re-applied to determine whether a principal having the modified context is permitted to access the resource.

20 Claims, 4 Drawing Sheets

(56) References Cited

OTHER PUBLICATIONS

Mostéfaoui, et al., "A Context-Based Approach of Security Policies", Retrieved at <<http://www.aaai.org/Papers/Flairs/2004/Flairs04-102.pdf>>, Proceedings of the Seventeenth International Florida Artificial Intelligence Research Society Conference, 2004, pp. 5.

Bertino, et al., "Analysis of Privacy and Security Policies", Retrieved at <<http://www.cs.purdue.edu/homes/ni/file/AnalysisIBMJournal.pdf>>, IBM Journal of Research and Development, vol. 53, No. 2, Mar. 2009, pp. 1-17.

* cited by examiner

TARGET-BASED ACCESS CHECK INDEPENDENT OF ACCESS REQUEST

BACKGROUND

As computers have become increasingly connected to one another via the Internet and other networks, situations oftentimes arise where it is desirable to allow particular users of various computers to access a resource (such as a file) stored on another computer. Policies can be created that describe which users are allowed to access which resources, and these policies can be applied to determine whether a particular user can access the resource. However, it can be problematic to test these policies to verify that they indeed operate as intended, allowing the appropriate users to access the resource and preventing others from accessing the resource.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a context of a principal is built, at a target system controlling access to a resource, independently of the principal requesting access to the resource. An authorization policy is applied, at the target system, to the context to determine whether the principal is permitted to access the resource.

BRIEF DESCRIPTION OF THE DRAWINGS

The same numbers are used throughout the drawings to reference like features.

DETAILED DESCRIPTION

A target-based access check independent of access request is discussed herein. A context of a principal (e.g., a user or system) that may attempt to access a resource is built at a target system including a resource manager controlling access to the resource. The context of the principal includes an authenticated identifier of the principal and/or one or more attributes of the principal. This context reflects the authenticated identifier and/or one or more attributes that the principal would have if indeed the principal were attempting to access the resource. The attributes can be assigned to the principal by the principal's device (e.g., the device that is used by or implements at least part of the principal), or by one or more other devices between the principal's device and the target system through which a principal's request to access the resource passes. The resource manager applies an authorization policy to the context of the principal to determine whether the principal would be permitted to access the resource given the authorization policy.

Additionally, an administrator can optionally modify the context of the principal and have the authorization policy re-applied to the modified context of the principal, allowing the administrator to check whether the principal would still be permitted to access the resource in light of the modifications to the context of the principal. Similarly, an administrator can optionally modify the authorization policy and have the modified authorization policy applied to the context of the principal, allowing the administrator to check whether the principal would still be permitted to access the resource in light of the modifications to the authorization policy.

Figure 1:
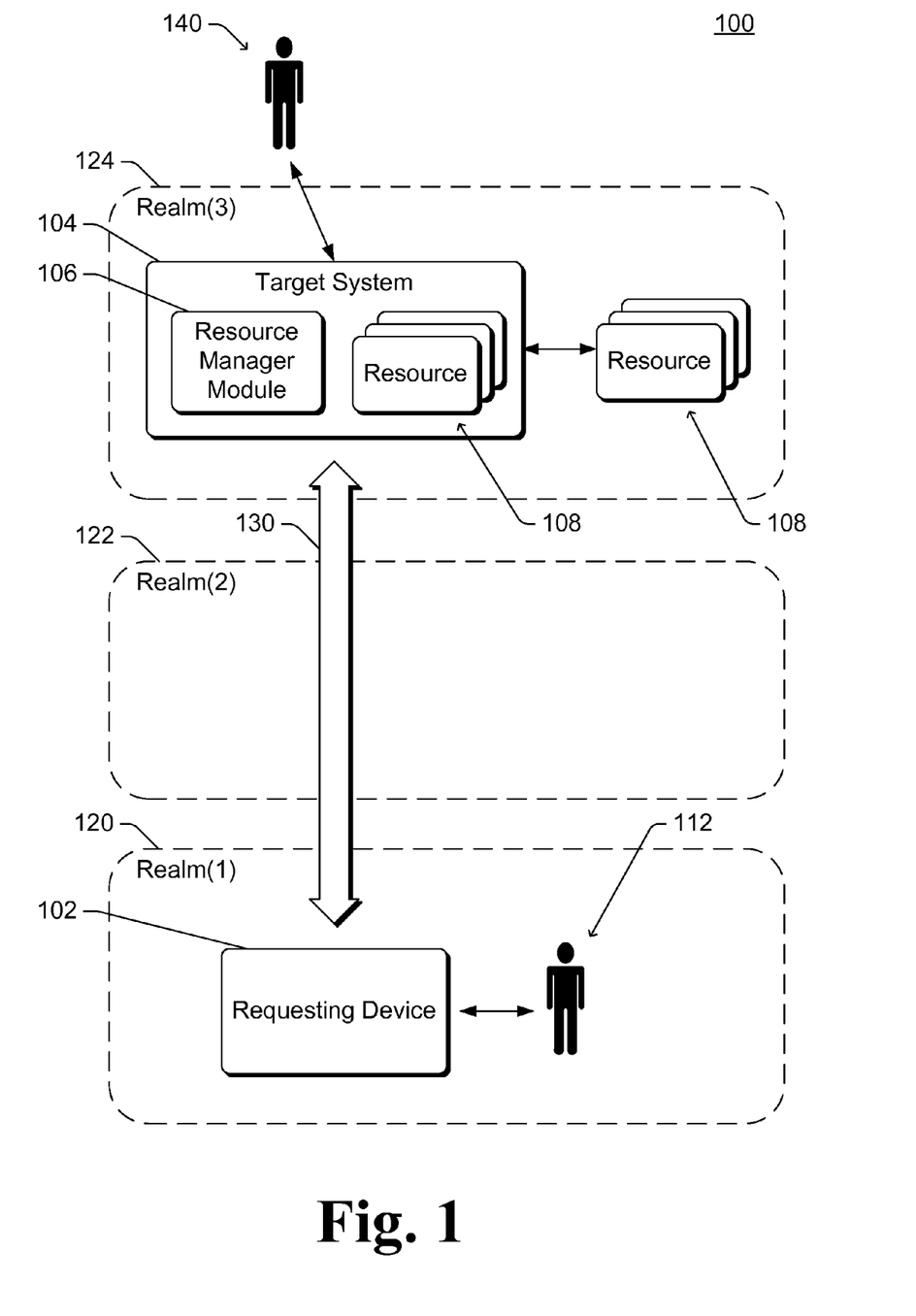
FIG. 1 illustrates an example system implementing the target-based access check independent of access request in accordance with one or more embodiments.

FIG. 1 illustrates an example system 100 implementing the target-based access check independent of access request in accordance with one or more embodiments. System 100 includes a requesting device 102 that can be a variety of different types of devices. For example, device 102 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth.

System 100 also includes a target system 104, which can be implemented on one or more devices. One or more of a variety of different types of devices can be used to implement target system 104, analogous to requesting device 102 discussed above. Requesting device 102 and target system 104 can communicate with one another via a variety of different networks, including the Internet, a local area network (LAN), a cellular or other phone network, an intranet, other public and/or proprietary networks, combinations thereof, and so forth. Because requesting device 102 and target system 104 typically communicate with one another via a network, device 102 and system 104 are also referred to as remote from one another.

Target system 104 includes a resource manager module 106 that controls access to one or more resources 108. Resource manager module 106, also referred to as simply a resource manager, can be implemented on one or more devices of target system 104. Resources 108 can be included as part of target system 104 and/or be coupled to target system 104. Additionally, in some situations target system 104 itself can be the resource. A resource 108 can be any component (hardware, software, and/or firmware) or portion thereof, module or portion thereof, functionality, information stored or provided by target system 104, combinations thereof, and so forth. A resource 108 can be a device or component, such as a printer, a scanner, a storage device, a communication device, and so forth. A resource 108 can also be particular functionality provided by a device or component (e.g., transmission and reception functionality of a communication device, network configuration functionality of a communication device, and so forth). A 108 resource can also be a file, a portion of a file, a collection of files or an area of a storage device (e.g., a folder, directory, disk partition, etc.), and so forth.

Resource manager module 106 receives requests from requesting device 102 to access one or more resources 108 by requesting device 102 (also referred to as access requests). These requests can be in response to user requests (e.g., a request of a user of requesting device 102 to read data in a file, access a scanner, and so forth) and/or in response to requests from a component or program of requesting device 102. The access to a resource 108 that is requested can vary, such as a request to read a resource, write or modify a resource, use functionality of a resource, and so forth. Although a single requesting device 102 is illustrated in FIG. 1, it should be noted that any number of requesting devices can request access to one or more resources 108 of target system 104. Similarly, although a single target system 104 is illustrated in FIG. 1, it should be noted that requesting device 102 can request access to any number of resources of any number of target systems.

Requests from requesting device 102 to access one or more resources 108 are associated with a principal. The principal can also be associated with requesting device 102, and a context of the principal (e.g., identifier and attributes, as discussed in more detail below) is the basis for determining by resource manager module 106 whether the requested access to a resource 108 will be permitted. A principal can be different entities, such as a user (such as user 112), a system (such as requesting device 102 or other system including requesting device 102), combinations thereof, and so forth. The manner in which the principal can be associated with requesting device 102 can vary based on the type of entity the principal is. For example, the principal can be a user of requesting device 102, can be a system including requesting device 102, and so forth.

System 100 also includes multiple realms 120, 122, and 124. Although three realms are illustrated in FIG. 1, system 100 can include any number of realms. Requests from requesting device 102 to access a resource 108 of target system 104 follow a path 130 that can pass through any number of realms. A realm is typically an administrative entity or domain, such as a domain of a Microsoft Active Directory® directory service, that establishes various security properties for each device or component within that domain or managed by that administrative entity. Each realm can be, for example, a Kerberos realm. A realm can include one or more devices or components that implement a network or portion of a network, and that can alter a context of a principal included in a request passing through the realm.

A principal has an associated authenticated identifier. The authenticated identifier is obtained from another component or device (e.g., in realm 120 or alternatively another realm) in response to the principal authenticating itself to the component or device. The principal can authenticate itself to the other component or device in a variety of different manners, such as by proving to that other component or device that the principal possesses valid credentials, such as knowledge of a secret phrase (e.g., a password), a private key corresponding to a certificate (e.g., a smart card or Trusted Platform Module (TPM)-based authentication (e.g., based on the TPM Main Specification 1.2 Revision 116, March 2011, available from the Trusted Computing Group)), a temporal secret (e.g., a one-time password), and so forth. The authenticated identifier can take various forms, such as a digital certificate digitally signed by the component or device to which the principal was authenticated.

Additionally, a principal has one or more associated attributes that describe various characteristics of the principal and/or the requesting device 102 being used by the principal. These attributes can include static and/or contextual information. Static information refers to information that does not typically change each time the principal is authenticated. For example, static information can be a name of a user or program, a citizenship of a user, an employment status of a user, a manager or supervisor of a user, a distributor of a program, a manufacturer of a device, and so forth. Contextual information refers to information that is more likely to change each time the principal is authenticated. For example, contextual information can be an indication of a type of the requesting device (e.g., phone or desktop computer), a location (e.g., country) of the user or device, whether the requesting device 102 is a secure device or a public device, a manner in which the user or program authenticated itself (e.g., name and password was used, smartcard was used, etc.).

Generally, to access a resource 108, a principal 112 sends a request which progresses along path 130 through one or more realms. Target system 104 receives the request, which includes the authenticated identifier associated with the principal and/or a set of one or more attributes associated with the principal. The authenticated identifier and/or set of one or more attributes are also referred to as the context of the principal. Resource manager module 106 applies an authorization policy to the context of the principal, the authorization policy including a set of criteria indicating whether particular principals are or are not (based on their associated authenticated identifier and/or attributes) permitted to access particular resources. Resource manager module 106 proceeds to permit or deny the requesting device access to the requested resource based on the application of the authorization policy.

The context of the principal can be modified in one or more realms, the modifying including adding attributes associated with the principal, removing attributes associated with the principal, changing attributes associated with the principal, removing the authenticated identifier, and combinations thereof. Each realm can modify the context of the principal in various manners based on the configuration of that realm and the context of the principal received by that realm. For example, a device in a realm can determine whether and/or how to modify the context of the principal based solely on configuration of the realm (e.g., a particular attribute is added to a context regardless of other attributes in the context), based on the authenticated identifier in the context, based on attributes in the context, based on a direction of the path along which the request progresses (e.g., where the request is coming from, where the request is going to, etc.), combinations thereof, and so forth.

The context of the principal associated with request sent along path 130 can be identified in a variety of different manners. In one or more embodiments, a context descriptor includes the authenticated identifier of the principal and/or the set of one or more attributes associated with the principal. Each device in path 130 that modifies the context generates a new context descriptor that includes the context received from the previous device in path 130 and any changes to the context, and digitally signs the new context descriptor. Such a device can also verify the context descriptor from a previous device in path 130 (e.g., based on a digital signature on the received context descriptor, by nature of receiving the context descriptor via a secure communication channel, and so forth).

Alternatively, the context of the principal can be identified in other manners. For example, each device in path 130 that modifies the context can generate a new context descriptor that identifies the modifications that that device makes to the context. This new context descriptor can be digitally signed by that device (or alternatively another device or component). In this example, target system 104 can receive multiple digitally signed context descriptors, which are combined by target system 104 to obtain the context of the principal.

In system 100, zero or more attributes can be modified by a component or device of realm 120, zero or more attributes can be modified by a component or device of realm 122, and zero or more attributes can be modified by a component or device of realm 124. For example, one or more attributes can be associated with the principal 112 and added to the context of the principal 112 by the component or device in realm 120 that associates the authenticated identifier with principal 112. Following this example, one or more additional attributes can be added to the context of the principal 112 by a component or device of realm 122, and one or more of the attributes can be deleted from the context of the principal 112, resulting in a modified context associated with the principal 112. This modified context is provided, along with the request, to a component or device of realm 124.

System 100 also includes an administrator 140 of target system 104. An administrator refers to a person or other entity (e.g., a system) that is authorized to configure resource manager module 106 and/or perform access checks via resource manager module 106, whether directly authorized by target system 104 or delegated authorization from another person or other entity. The administrator 140 can optionally prove it is authorized to configure resource manager module 106 and/or perform access checks via resource manager module 106 in different manners, such as by authenticating itself to resource manager module 106 (e.g., in various manners, analogous to the discussion above regarding the principal authenticating itself). Administrator 140 can interact with resource manager module 106 using a device of target system 104, or alternatively another computing device (which can be a variety of different types of devices, analogous to the discussion above regarding requesting device 102 and target system 104). Administrator 140 can optionally communicate with target system 104 via a network (e.g., any of a variety of different networks analogous to the discussion above), and thus can also be referred to as remote from target system 104. Resource manager module 106 allows an administrator 140 to create authorization policies for target system 104, thus allowing administrator 140 to change the authorization policy over time as he or she desires.

Additionally, target system 104 can build contexts for principals. Building a context of a principal refers to target system 104 coordinating generating of an authenticated identifier associated with a principal and attributes associated with the principal rather than receiving the context as part of a request. The context of a principal that is built by target system 104 is analogous to a context that would be generated for the principal when requesting access to a resource, but is generated as if the principal were requesting access to a resource 108 rather than the principal actually requesting access to the resource. Thus, the context of a principal can be built independent of (and without) the principal actually requesting access to the resource. Building such contexts facilitates performing an access check to verify that the authorization policy of the target system operates as intended, as discussed in more detail below. The building of the contexts is target-based, being coordinated by the target system 104 as discussed in more detail below.

Figure 2:
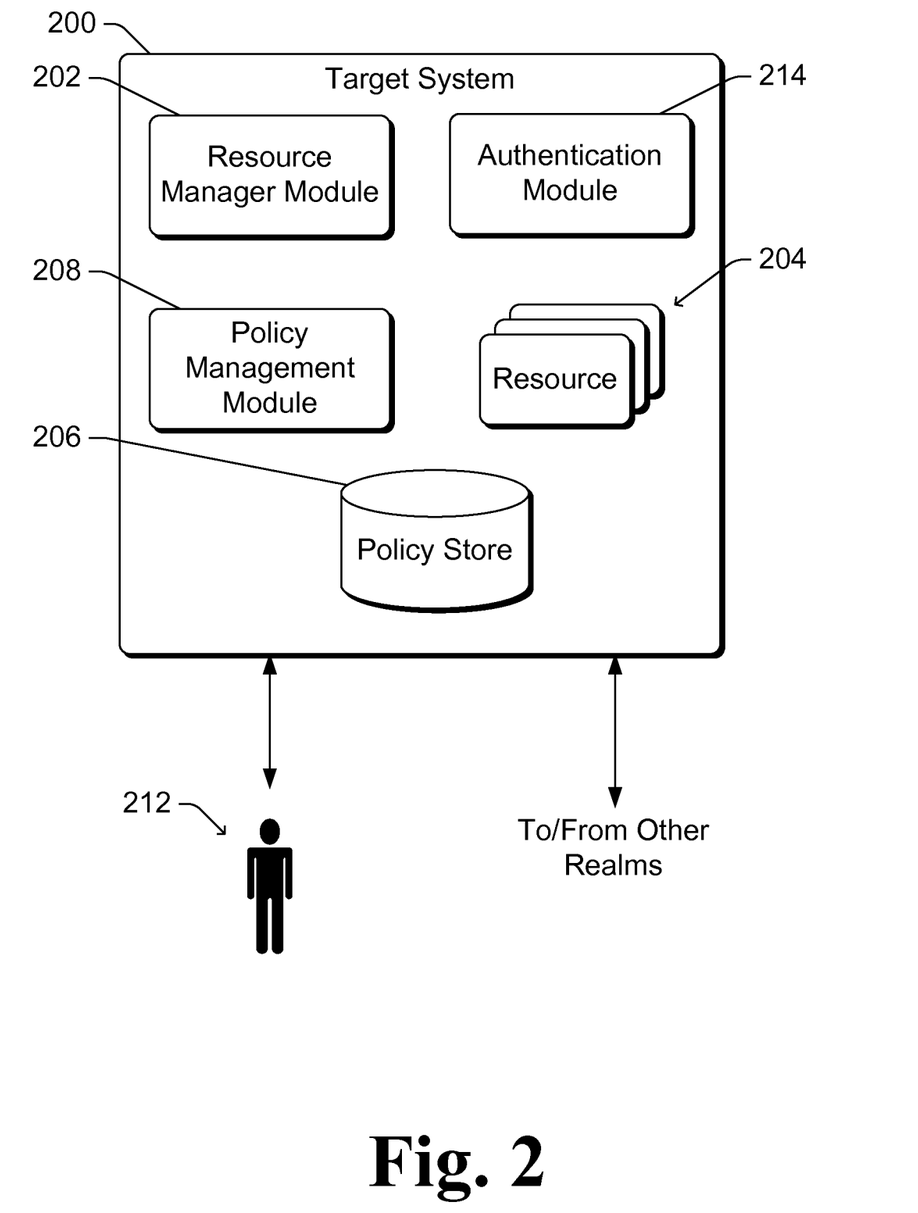
FIG. 2 is a block diagram illustrating an example target system in accordance with one or more embodiments.

FIG. 2 is a block diagram illustrating an example target system 200 in accordance with one or more embodiments. Target system 200 can be, for example, a target system 104 of FIG. 1. Target system 200 includes a resource manager module 202 (which can be a resource manager module 106 of FIG. 1) and one or more resources 204 (which can be resources 108 of FIG. 1). Although illustrated as being part of target system 200, one or more resources 204 can be external but coupled to target system 200, or target system 200 itself can be a resource, as discussed above with reference to resources 108 of FIG. 1.

Target system 200 also includes a policy store 206 and a policy management module 208. Policy store 206 maintains one or more authorization policies that are applied by resource manager module 202 to determine whether a requesting device is permitted to access a resource 204. Each authorization policy in policy store 206 includes one or more criteria (e.g., rules, formulas, conditions, etc.) that are to be satisfied in order for the requested access to be permitted. For example, the criteria can specify a type of requesting device that is to be associated with the principal in order for the principal to be permitted access to the resource, a particular employment status the principal is to have in order to be permitted access to the resource, a manner in which the principal is to have authenticated itself (to obtain the authenticated identifier) in order to be permitted access to the resource, combinations thereof, and so forth. Resource manager module 202 applies the authorization policy in policy store 206 to the context of the principal to determine whether the requesting device is permitted to access the resource. If the criteria of the authorization policy are satisfied by the context of the principal then the principal is permitted to access the resource, and if the criteria of the authorization are not satisfied by the context of the principal then the principal is not permitted to access the resource. Policy store 206 can include one authorization policy that is applied to multiple requesting devices (or principals), or alternatively different authorization policies for different requesting devices (or principals) or groups of requesting devices (or principals).

Additionally, an authorization policy in policy store 206 can be changed to a new authorization policy (e.g., by an administrator 212). Policy management module 208 receives requests to change an authorization policy in policy store 206 and performs the requested changes (optionally after verifying that the request is from an appropriate administrator). Policy management module 208 also manages performing access checks to verify that an authorization policy in policy store 206 performs as intended. A request to perform an access check is received from an administrator 212, and can be received in different manners, such as via the administrator 212 using a device of target system 200, the administrator 212 using another device or system to communicate with target system 200 (e.g., remotely via a network) and so forth. To perform an access check, an authentication module 214 builds a context of a principal, as discussed in more detail below.

Target system 200 performs access checks independently of a request to access a resource 204. An access check refers to a check as to whether a particular principal would be permitted to access a resource 204 if the principal were to request access to the resource 204. It should be noted that in order for an access check to be performed, the principal need not have previously requested access to the resource, and need not subsequently request access to the resource. Furthermore, the principal need not be aware (and typically is not aware) that the access check is made. An access check is typically performed by resource manager module 202 in response to a request from an administrator 212, although the access check can alternatively be performed in response to requests from other components, devices, or individuals.

To perform the access check, policy management module 208 receives a request (e.g., from administrator 212) to perform the access check, and requests that authentication module 214 build a context of a principal. Authentication module 214 builds the context of the principal and provides the built context to resource manager module 202. Alternatively another component or module (e.g., resource manager module 202) can build the context of the principal. Resource manager module 202 then applies the authorization policy in policy store 206 to the context built for the principal to determine whether the requesting device would be permitted to access the resource 204. An indication of whether the requesting device would be permitted to access the resource 204 is returned to the administrator 212, allowing the administrator to verify whether the policy in policy store 206 is working as intended. It should be noted that the context built for the principal is the context that the principal would have if access to the resource 204 were being requested, even though access to a resource 204 is not being requested.

To build the context of the principal, authentication module 214 receives an indication of a principal (e.g., from the administrator) and a requesting device (e.g., a requesting device associated with the principal). Authentication module 214 is also aware of (or can discover) the path that requests for access to resources 204 from a particular requesting device take (e.g. path 130 of FIG. 1). Authentication module 214 can obtain the indication of the path that requests take in different manners, such as receiving the indication from the administrator, obtaining the indication from another component or module, obtaining the indication from a requesting device (e.g., as part of a previous request to access resource 204), and so forth. In one or more embodiments, to build the context of the principal authentication module 214 leverages functionality supported by target system 200 and devices in other realms to facilitate building the context. For example, authentication module 214 can leverage the "Services for User to Self" functionality supported by some of the operating systems in the Windows® operating system family. Additional information regarding the Windows® operating systems are available from Microsoft Corporation of Redmond, Wash.

Authentication module 214 sends a request to the requesting device for the authenticated identification and attributes (if any) that the principal would receive at the requesting device if the principal were requesting access to a resource 204 of target system 200. In response, the requesting device obtains the authenticated identifier and zero or more attributes associated with the principal. If the principal could authenticate itself in different manners, then one of those different manners is selected (e.g., an indication of the manner in which the principal is assumed to have authenticated itself can be provided by authentication module 214 as part of the request). The requesting device returns the authenticated identifier and zero or more attributes to authentication module 214. The authenticated identifier and zero or more attributes are returned to authentication module 214 in the same form (e.g., using the same data structure, digitally signed in the same manner, etc.) as would be used if the requesting device were to be requesting access to a resource 204 and providing the authenticated identifier and zero or more attributes to a next device in the path to target system 200.

Authentication module 214 receives the authenticated identifier and zero or more attributes from the requesting device, and sends a request that includes the authenticated identifier and zero or more attributes to a next device in the path from the requesting device to target system 200. For example, authentication module 214 can send the request to a device in realm 122 of FIG. 1 that would receive a resource access request from requesting device 102. The device in that realm receives the request from authentication module 214, and modifies the attributes associated with the principal in the same manner as if the requesting device had provided the authenticated identifier and zero or more attributes to the device in that realm as part of a request to access a resource 204. The device then returns to authentication module 214 the authenticated identifier and modified attributes. The authenticated identifier and modified attributes are returned to authentication module 214 in the same form (e.g., using the same data structure, digitally signed in the same manner, etc.) as would be used if the device in that realm were to be providing the authenticated identifier and modified attributes to a next device in the path to target system 200 for a requesting device requesting access to a resource 204.

Authentication module 214 continues this process of sending requests to devices in the path to target system 200, each time including with the request the authenticated identifier and attributes associated with the principal received from the previous device in the path to target system 200. After receiving a response from the last device in the path prior to target system 200, authentication module 214 has the authenticated identifier and attributes that would be received if the principal were making a request for an access to a resource 204. This authenticated identifier and attributes received from the previous device in the path to target system 200 is the context of the principal built by authentication module 214, authentication module 214 provides this context to resource manager module 202. Alternatively, if target system 200 would modify the authenticated identifier and/or attributes received as part of a request to access a resource 204, then those modifications are also made to the authenticated identifier and/or attributes received from the previous device in the path prior to providing the context to resource manager module 202.

In the discussions above reference is made to the authenticated identifier being received by target system 200. It should be noted, however, that situations can arise in which a device in a realm along the path from the requesting device to target system 200 removes the authenticated identifier. In such situations, attributes associated with the principal are received by target system 200 and are part of the context built by target system 200, but the authenticated identifier is not part of the context built by target system 200.

Additionally, an administrator 212 can (e.g., via policy management module 208) modify the context built for a principal by authentication module 214. The current context built by authentication module 214 can, for example, be displayed to the administrator 212, who can in turn make the modifications he or she desires. Resource manager module 202 then applies the authorization policy in policy store 206 to the modified context built for the principal to determine whether the requesting device (with a principal having the modified context) would be permitted to access the resource. An indication of whether the requesting device would be permitted to access the resource with the modified context is returned to the administrator 212, allowing the administrator to determine the result of the modification to the context built for the principal.

For example, a context built for a principal may indicate that the principal is a full-time employee of a particular corporation. The administrator can modify the context to indicate that the principal is a part-time employee of the particular corporation, have the authorization policy applied to the modified context, and determine whether there would be any resultant change in access that is permitted to the resource. By way of another example, a context built for a principal may indicate that the principal has authenticated himself or herself using a smartcard. The administrator can modify the context to indicate that the principal authenticated himself or herself using a name and password, have the authorization policy applied to the modified context, and determine whether there would be any resultant change in access that is permitted to the resource.

Similarly, an administrator 212 can (e.g., via policy management module 208) modify an authorization policy in policy store 206. The administrator can author a new authorization policy that replaces a current authorization policy in policy store 206, or alternatively identify (e.g., to policy management module 208) changes to make to a current authorization policy in policy store 206. The modified policy can then be applied to a context built for the principal to determine whether the requesting device would be permitted to access the resource with the modified authorization policy. An indication of whether the requesting device would be permitted to access the resource with the modified authorization policy is returned to the administrator 212, allowing the administrator to determine the result of the modification to the authorization policy. It should be noted that the administrator can modify the context built for a principal, the authorization policy, or both the context built for a principal and the authorization policy.

Figure 3:
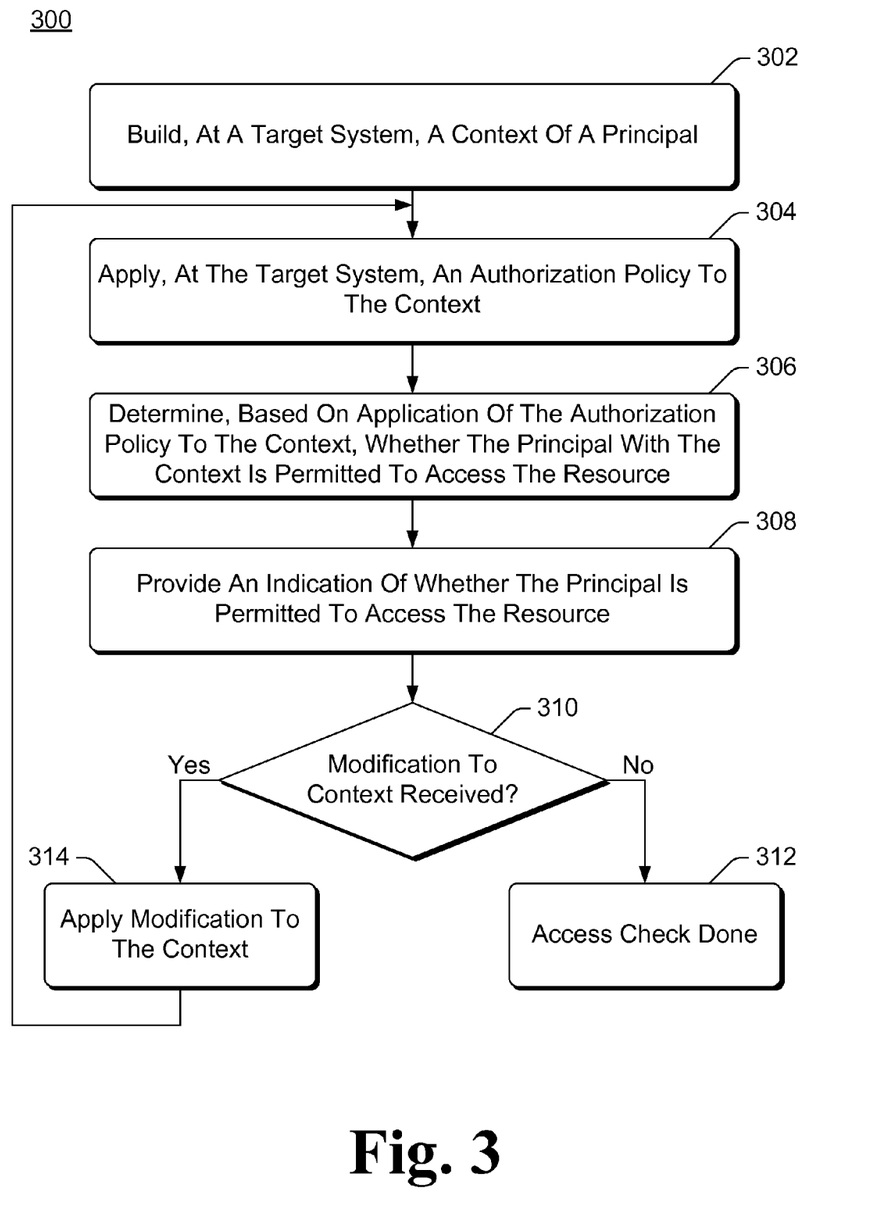
FIG. 3 is a flowchart illustrating an example process for a system implementing the target-based access check independent of access request in accordance with one or more embodiments.

FIG. 3 is a flowchart illustrating an example process 300 for a system implementing the target-based access check independent of access request in accordance with one or more embodiments. Process 300 is carried out by a system, such as target system 200 of FIG. 2, and can be implemented in software, firmware, hardware, or combinations thereof. Process 300 is shown as a set of acts and is not limited to the order shown for performing the operations of the various acts. Process 300 is an example process for implementing the target-based access check independent of access request; additional discussions of implementing the target-based access check independent of access request are included herein with reference to different figures.

In process 300, a context of a principal is built at a target system (act 302). The context is built for an access check, and is built to be the same context as if the principal were requesting access to a resource controlled by a resource manager of the target system, but is built independently of the principal requesting access to the resource as discussed above.

An authorization policy is applied to the context at the target system (act 304). The authorization policy includes various criteria indicating whether particular principals are or are not permitted to access particular resources, as discussed above.

A determination is made, based on application of the authorization policy to the context, whether the principal having the context is permitted to access the resource (act 306). If the criteria of the authorization policy are satisfied by the context, then the principal is permitted to access the resource as discussed above.

An indication of whether the principal is permitted to access the resource is provided (act 308). The indication can be provided to, for example, an administrator as discussed above.

Process 300 proceeds based on whether a modification to the context built in act 302 is received (act 310). If no modification to the context is received, then the access check is done (act 312). However, if a modification to the context is received, then the modification is applied to the context (act 314). Process 300 then returns to act 304, where the authorization policy is applied to the modified context. Process 300 then continues to determine and provide an indication of whether access to the resource is permitted for the principal having the modified context (even though, because the context has been modified, no principal may actually have that context). Acts 304-314 can be repeated any number of times with different modifications to the context.

It should be noted that although reference is made herein to the target system (e.g., target system 104 of FIG. 1 or target system 200 of FIG. 2) building the context and applying the authorization policy to the context, the target system building the context and/or applying the authorization policy also refers to situations in which building the context and/or applying the authorization policy to the context is performed at least in part by one or more other systems. For example, the target system can have one or more other systems or devices perform at least part of building the context and/or applying the authorization policy to the context on behalf of the target system, such as one or more other systems or devices operating under the direction and/or control of the target system. By way of another example, the target system can be part of a service that includes multiple systems, and one or more of those multiple systems can perform at least part of building the context and/or applying the authorization policy to the context.

Thus, the target-based access check independent of access request techniques discussed herein allow the building of a context for a principal under the coordination of the target system. Modifications to the context of the principal made by devices along the path from the requesting device to the target system are reflected in the context that is built, and the context is not limited to just the requesting device's knowledge of attributes in the context. Additionally, the authorization policy is applied to the context by the target system rather than by the requesting device, so the authorization policy that would be applied to the context of the principal if access to a resource were actually requested by the principal is the authorization policy that is applied. An accurate determination can thus be made of whether the principal would be permitted access to a resource given a particular authorization policy. Various modifications to the authorization policy and/or context can also be made to allow, for example, an administrator to perform various additional access checks based on various changes to the authorization policy and/or context.

Various actions such as communicating, receiving, sending, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 4:
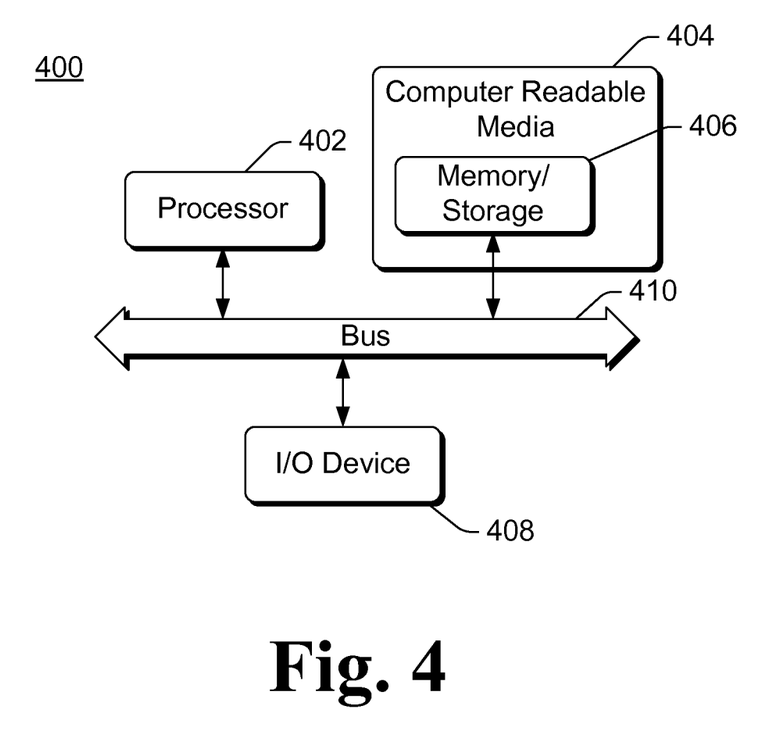
FIG. 4 illustrates an example computing device that can be configured to implement the target-based access check independent of access request in accordance with one or more embodiments.

FIG. 4 illustrates an example computing device 400 that can be configured to implement the target-based access check independent of access request in accordance with one or more embodiments. Computing device 400 can be, for example, computing device 102 of FIG. 1, or implement at least part of target system 104 of FIG. 1 of target system 200 of FIG. 2.

Computing device 400 includes one or more processors or processing units 402, one or more computer readable media 404 which can include one or more memory and/or storage components 406, one or more input/output (I/O) devices 408, and a bus 410 that allows the various components and devices to communicate with one another. Computer readable media 404 and/or one or more I/O devices 408 can be included as part of, or alternatively may be coupled to, computing device 400. Bus 410 represents one or more of several types of bus structures, including a memory bus or memory controller, a peripheral bus, an accelerated graphics port, a processor or local bus, and so forth using a variety of different bus architectures. Bus 410 can include wired and/or wireless buses.

Memory/storage component 406 represents one or more computer storage media. Component 406 can include volatile media (such as random access memory (RAM)) and/or nonvolatile media (such as read only memory (ROM), Flash memory, optical disks, magnetic disks, and so forth). Component 406 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 402. It is to be appreciated that different instructions can be stored in different components of computing device 400, such as in a processing unit 402, in various cache memories of a processing unit 402, in other cache memories of device 400 (not shown), on other computer readable media, and so forth. Additionally, it is to be appreciated that the location where instructions are stored in computing device 400 can change over time.

One or more input/output devices 408 allow a user to enter commands and information to computing device 400, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 4. The features of the target-based access check independent of access request techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   building, at a target computing system controlling access to a resource, a context of a principal independently of the principal requesting access to the resource, the context including an authenticated identifier of the principal and one or more attributes associated with the principal; and
   applying, at the target system and independently of the principal requesting access to the resource, an authorization policy to the context;
   determining, at the target system based on the applying, whether the principal is permitted to access the resource;
   providing, based on the determining, an indication of whether the principal is permitted to access the resource;
   modifying the context;
   applying, at the target system, the authorization policy to the modified context;
   determining, at the target system based on the applying of the authorization policy to the modified context, whether a principal having the modified context is permitted to access the resource; and
   providing, to an administrator and based on the determining of whether a principal having the modified context is permitted to access the resource, an indication of whether the principal having the modified context is permitted to access the resource.

2. The method as recited in claim 1, the resource comprising a resource included as part of or coupled to the target computing system.

3. The method as recited in claim 1, performing the building and applying in response to a request from the administrator.

4. The method as recited in claim 1, a first one or more of the attributes being modified by a device of a first realm through which a path from a requesting device associated with the principal to the target computing system passes, and a second one or more of the attributes being modified by a device of a second realm through which the path passes.

5. The method as recited in claim 4, an attribute being modified comprising an attribute being added to a context of the principal or removed from the context of the principal by a device of a realm.

6. The method as recited in claim 1, the principal comprising a user of a requesting device, and the context including one or more user attributes of the user of the requesting device.

7. The method as recited in claim 1, the context including one or more attributes of a requesting device associated with the principal.

8. The method as recited in claim 1, the context including one or more attributes that include static information.

9. The method as recited in claim 1, the context including one or more attributes that include contextual information.

10. One or more computer storage devices having stored thereon multiple instructions that, when executed by one or more processors of a target system, cause the one or more processors to:

build a context of a principal as if the principal were requesting access to a resource, a resource manager of the target system controlling access to the resource, the context including an authenticated identifier of the principal and one or more attributes associated with the principal;

apply, independently of the principal requesting access to the resource, an authorization policy to the context to determine whether the principal is permitted to access the resource; and determine, at the target system based on the applying, whether the principal is permitted to access the resource;

provide, to an administrator, an indication of whether the principal is permitted to access the resource;

modify the context;

apply, at the target system, the authorization policy to the modified context;

determine, at the target system based on the applying of the authorization policy to the modified context, whether a principal having the modified context is permitted to access the resource; and provide, to an administrator and based on the determining of whether a principal having the modified context is permitted to access the resource, an indication of whether the principal having the modified context is permitted to access the resource.

11. The one or more computer storage devices as recited in claim 10, the instructions causing the one or more processors to provide an indication of whether the principal is permitted to access the resource including instructions causing the one or more processors to provide the indication, via a remote device, to the administrator.

12. The one or more computer storage devices as recited in claim 10, a first one or more of the attributes being modified by a device of a first realm through which a path from a requesting device associated with the principal to the target system passes, and a second one or more of the attributes being modified by a device of a second realm through which the path passes.

13. The one or more computer storage devices as recited in claim 12, an attribute being modified comprising an attribute being added to a context of the principal or removed from the context of the principal by a device of a realm.

14. The one or more computer storage devices as recited in claim 10, the principal comprising a user associated with a requesting device from which the principal would request access to the resource.

15. A system comprising:
at least one processor;
a memory, operatively connected to the at least one processor and containing instructions that, when executed by the at least one processor, cause the at least one processor to perform a method, the method comprising:
building, at a target system controlling access to a resource, a context of a principal independently of the principal requesting access to the resource, the context including an authenticated identifier of the principal and one or more attributes associated with the principal;
applying, at the target system and independently of the principal requesting access to the resource, an authorization policy to the context;
determining, at the target system based on the applying, whether the principal is permitted to access the resource;
providing, based on the determining, an indication of whether the principal is permitted to access the resource;
modifying the context;
applying, at the target system, the authorization policy to the modified context;
determining, at the target system based on the applying of the authorization policy to the modified context, whether a principal having the modified context is permitted to access the resource; and
providing, to an administrator and based on the determining of whether a principal having the modified context is permitted to access the resource, an indication of whether the principal having the modified context is permitted to access the resource.

16. The system as recited in claim 15, a first one or more of the attributes being modified by a device of a first realm through which a path from a requesting device associated with the principal to the target computing system passes, and a second one or more of the attributes being modified by a device of a second realm through which the path passes.

17. The system as recited in claim 16, an attribute being modified comprising an attribute being added to a context of the principal or removed from the context of the principal by a device of a realm.

18. The system as recited in claim 15, the context including one or more attributes of a requesting device associated with the principal.

19. The system as recited in claim 15, the context including one or more attributes that include static information.

20. The system as recited in claim 15, the context including one or more attributes that include contextual information.

* * * * *